United States Patent
Miyasaka

(10) Patent No.: US 9,883,433 B2
(45) Date of Patent: Jan. 30, 2018

(54) CONTENT DISTRIBUTION DEVICE

(71) Applicant: Toshiba Memory Corporation, Minato-ku (JP)

(72) Inventor: Toshiki Miyasaka, Saitama (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 336 days.

(21) Appl. No.: 14/845,905

(22) Filed: Sep. 4, 2015

(65) Prior Publication Data
US 2016/0262064 A1 Sep. 8, 2016

Related U.S. Application Data

(60) Provisional application No. 62/128,108, filed on Mar. 4, 2015.

(51) Int. Cl.
*H04W 4/00* (2009.01)
*H04W 36/06* (2009.01)
(Continued)

(52) U.S. Cl.
CPC .......... *H04W 36/06* (2013.01); *H04L 67/06* (2013.01); *H04W 36/0033* (2013.01); *H04W 36/14* (2013.01)

(58) Field of Classification Search
None
See application file for complete search history.

(56) References Cited

U.S. PATENT DOCUMENTS 8,363,618 B2 * 1/2013 Callahan ............... G06Q 30/02
370/331
8,660,959 B2 * 2/2014 Callahan ............... G06Q 30/02
370/331

(Continued)

FOREIGN PATENT DOCUMENTS

JP 5264600 8/2013
JP 2013-179582 9/2013
JP 2014-192695 10/2014

OTHER PUBLICATIONS

Kaigian et al., Dasher: A Peer to Peer Content Distribution System Bsed on Combined Network Coding, 2009, University of Science and Technology, China, All.*

*Primary Examiner* — Mark Rinehart
*Assistant Examiner* — Angel Brockman
(74) *Attorney, Agent, or Firm* — Oblon, McClelland, Maier & Neustadt, L.L.P.

(57) ABSTRACT

According to one embodiment, a content distribution device includes a first connecting unit that is connectable to a first storage device including a first wireless communication unit that performs data communication based on a first wireless communication system, a second connecting unit that is connectable to a second storage device including a second wireless communication unit that performs data communication based on a second wireless communication system, and a controller. The controller switches communication with a content reception device from the first wireless communication system to the second wireless communication system while a distribution data file is being transmitted to the content reception device, and hands over second information indicating a packet number to the second wireless communication unit.

20 Claims, 12 Drawing Sheets

(51) Int. Cl.
*H04L 29/08* (2006.01)
*H04W 36/00* (2009.01)
*H04W 36/14* (2009.01)

(56) References Cited

U.S. PATENT DOCUMENTS

| | | | |
|---|---|---|---|
| 8,850,003 B2 * | 9/2014 | Khasnabish | G06F 17/30094 370/331 |
| 8,926,900 B2 * | 1/2015 | Elders | G01N 30/66 422/54 |
| 9,086,830 B2 * | 7/2015 | Miyazaki | G06F 3/1236 |
| 2006/0109818 A1 * | 5/2006 | Ramanna | H04W 36/14 370/331 |
| 2006/0126564 A1 * | 6/2006 | Ramanna | H04W 36/14 370/331 |
| 2014/0293327 A1 | 10/2014 | Miyazaki | |

* cited by examiner

| MAC ADDRESS OF CONTENT RECEPTION DEVICE | Unique ID OF CONTENT RECEPTION DEVICE | AUTHENTICATION INFORMATION OF SECOND WIRELESS COMMUNICATION UNIT |
|---|---|---|
| | | |
| | | |
| | | |

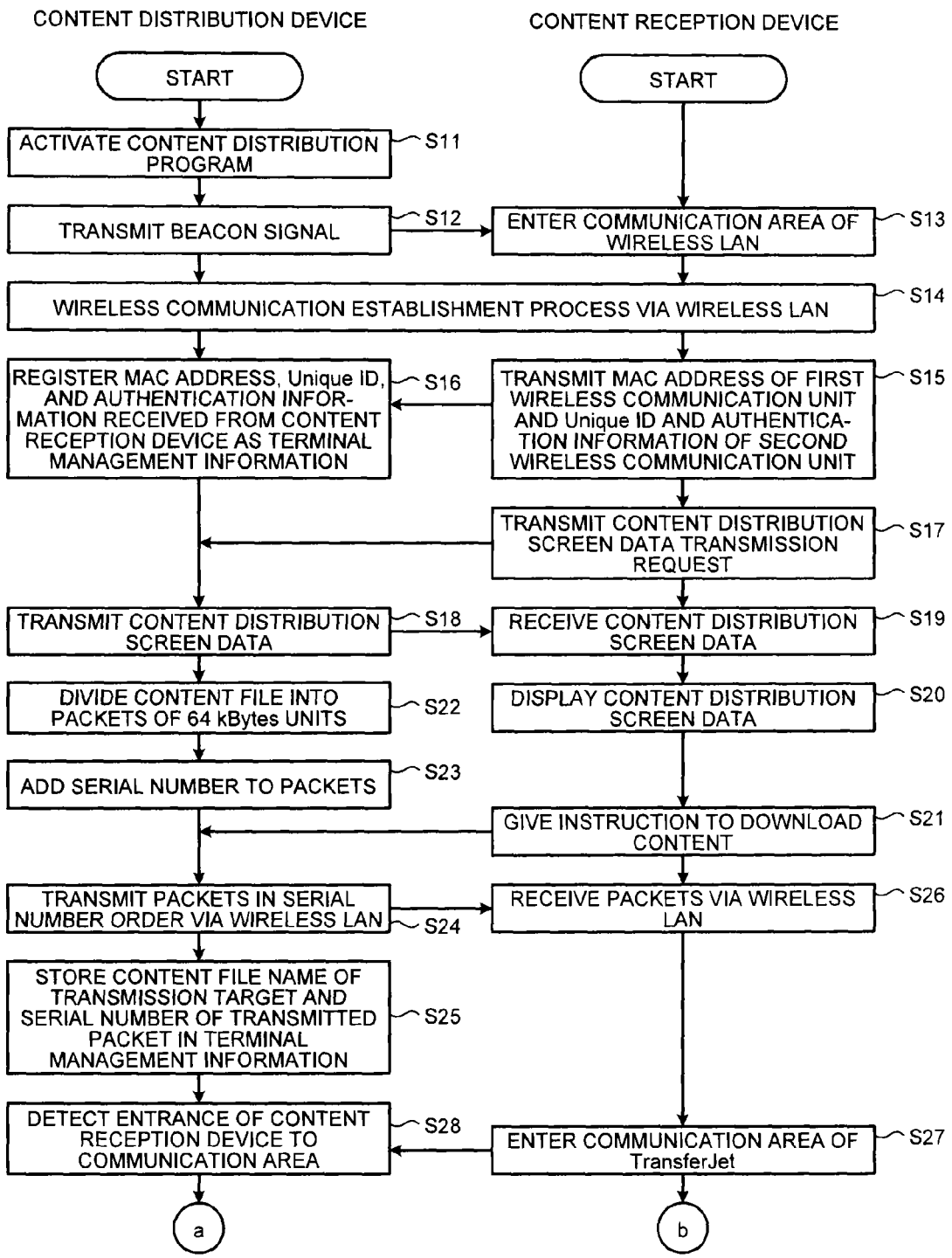

CONTENT DISTRIBUTION DEVICE

CROSS-REFERENCE TO RELATED APPLICATIONS

This application is based upon and claims the benefit of priority from U.S. Provisional Application No. 62/128,108, filed on Mar. 4, 2015; the entire contents of which are incorporated herein by reference.

FIELD

Embodiments described herein relate generally to a content distribution device.

BACKGROUND

In the past, devices that distribute content by means of a combination of a plurality of types of wireless communication systems, for example, an intermediate range wireless communication system having a communication range of about hundred meters (m) such as a wireless Local Area Network (LAN) and a short range wireless communication system having a communication range of about several centimeters (cm) such as TransferJet have not been proposed.

BRIEF DESCRIPTION OF THE DRAWINGS

FIG. 3 is a diagram schematically illustrating an exemplary content distribution screen data display process;

FIGS. 5A and 5B are flowcharts illustrating an exemplary procedure of a content distribution method according to the first embodiment;

DETAILED DESCRIPTION

According to one embodiment, a content distribution device includes a first connecting unit, a second connecting unit, and a controller. The first connecting unit is connectable to a first storage device including a first antenna and a first wireless communication unit that performs data communication with a content reception device through the first antenna based on a first wireless communication system. The second connecting unit is connectable to a second storage device including a second antenna and a second wireless communication unit that performs data communication with the content reception device through the second antenna based on a second wireless communication system. The first wireless communication system enables communication to be performed in a communication range larger than a communication range of the second wireless communication system, and the second wireless communication system enables communication to be performed at a data transfer rate higher than a data transfer rate of the first wireless communication system. The controller is configured to distribute a distribution data file to the content reception device. The controller is configured to divide the distribution data file into a plurality of packets, add first information indicating packet numbers in a transmission order, and transmit the packets having the first information. Further, the controller is configured to switch communication with the content reception device from the first wireless communication system to the second wireless communication system while transmitting the distribution data file to the content reception device. Further, the controller is configured to hand over second information including the packet number to the second wireless communication unit when the communication with the content reception device is switched from the first wireless communication system to the second wireless communication system. The second wireless communication unit transmits the packets from a middle of the transmission order based on the handed over second information to the content reception device.

Exemplary embodiments of a content distribution device will be described below in detail with reference to the accompanying drawings. The present invention is not limited to the following embodiments.

First Embodiment

Figure 1:
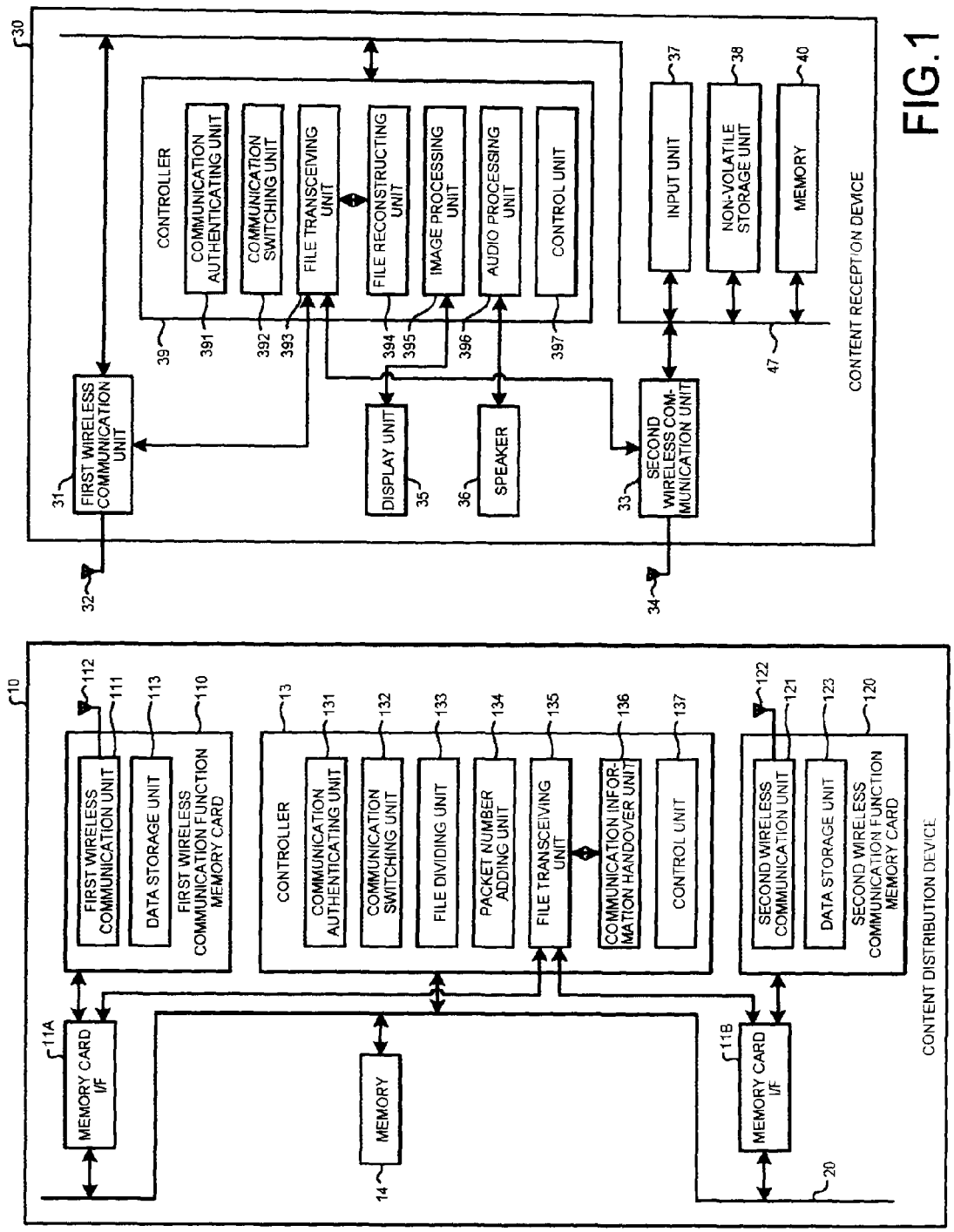
FIG. 1 is a block diagram schematically illustrating an exemplary configuration of a content distribution system according to a first embodiment.

FIG. 1 is a block diagram schematically illustrating an exemplary configuration of a content distribution system according to a first embodiment. The content distribution system includes a content distribution device 10 and a content reception device 30. The content distribution device 10 is configured to be connectable with the content reception device 30 through two or more types of wireless communication systems.

The content distribution device 10 is a device that distributes content such as moving image data, image data, or music data. The content distribution device 10 includes memory card I/Fs 11A and 11B, a controller 13, and a memory 14. The memory card I/Fs 11A and 11B, the controller 13, and the memory 14 are connected to one another via a bus 20.

Figure 2:
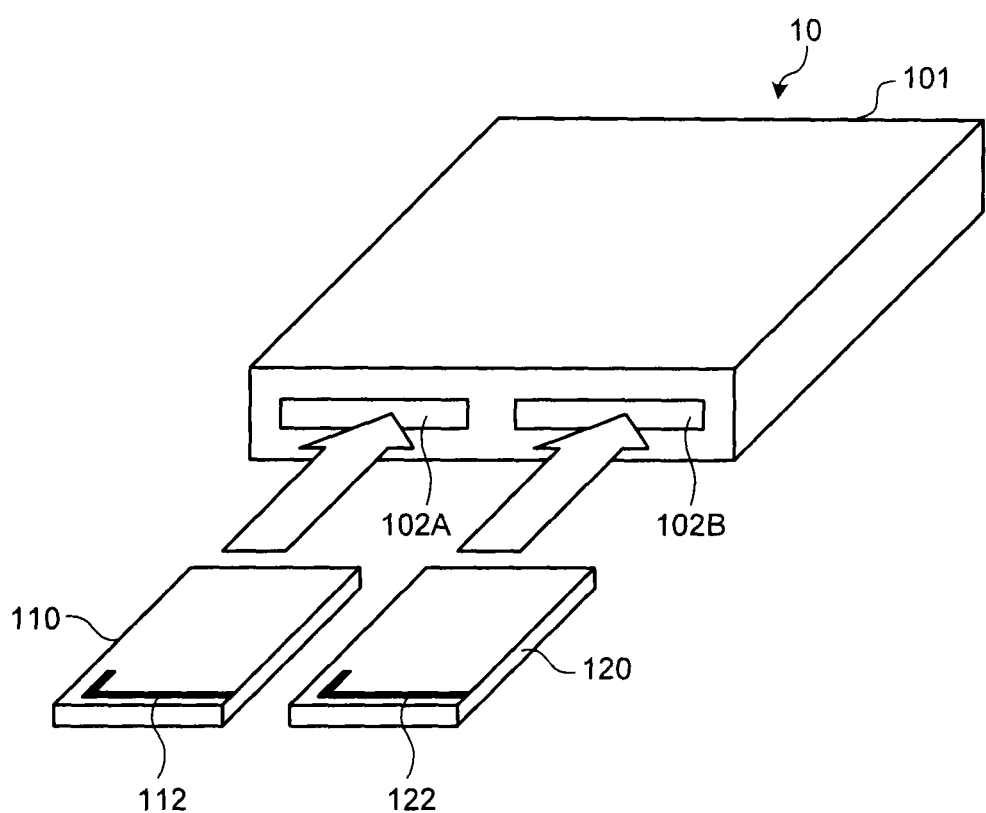
FIG. 2 is a perspective diagram schematically illustrating an exemplary configuration of the content distribution device according to the first embodiment.

The memory card I/Fs 11A and 11B exchange signals with a wireless communication function memory card to be connected. The content distribution device 10 is configured to be connected with a wireless communication function memory card. FIG. 2 is a perspective diagram schematically illustrating an exemplary configuration of the content distribution device according to the first embodiment. As illustrated in FIG. 2, two insertion slots 102A and 102B of memory cards are formed in a housing 101 of the content distribution device 10. As the memory cards are inserted into the insertion slots 102A and 102B, the memory cards are detachably held.

A first wireless communication function memory card 110 is connected to the memory card I/F 11A. The first wireless communication function memory card 110 is one in which a memory card including a non-volatile memory such as an NAND flash memory as a storage medium has a function capable of performing wireless communication according to a first wireless communication system. The first wireless communication function memory card 110 includes a first wireless communication unit 111, an antenna 112, and a data storage unit 113.

The first wireless communication unit 111 performs a wireless communication process with the content reception device 30 according to a first wireless communication system having a communication range of several tens of meters (m) or more. As the first wireless communication system, in addition a wireless LAN specified in IEEE 802.11a/b/g/n/ac and the like, Code Division Multiple Access (W-CDMA), CDMA2000 1×, High Speed Uplink Packet Access (HSPA) Evolution, Long Term Evolution (LTE), LTE-Advanced, Worldwide Interoperability for Microwave Access (WiMAX), WiMAX2, or the like can be used. In the following description, the first wireless communication system is assumed to be the wireless LAN.

For example, the first wireless communication unit 111 has a role of an access point (base station). The first wireless communication unit 111 transmits a beacon signal with a certain period. The beacon signal includes access point identification information identifying the first wireless communication unit 111 serving as the access point. For example, a Service Set Identifier (SSID) or the like may be used as the access point identification information.

The antenna 112 transmits data generated by the first wireless communication unit 111 through a wireless signal of the first wireless communication system. Further, the antenna 112 receives the wireless signal of the first wireless communication system from the content reception device 30. As illustrated in FIG. 2, the antenna 112 is printed on the top surface of the first wireless communication function memory card 110.

The data storage unit 113 stores a content file serving as a distribution data file and content distribution screen data. The content file is content that is distributed to the content reception device 30. Examples of the content include moving image data, image data, and music data. The content distribution screen data is data that is displayed on a display unit 35 of the content reception device 30. FIG. 3 is a diagram schematically illustrating an exemplary content distribution screen data display process. FIG. 3 illustrates a content distribution screen 300 in which the content distribution screen data is displayed on the display unit 35. The content distribution screen 300 of the content reception device 30 includes a content list 310 and a download button 320.

The content list 310 is a list of content files that are stored in the data storage unit 113 and distributable by the content distribution device 10. Individual content configuring the content list 310 is configured with a button 311. The user can select the button 311 of content that is desired to be downloaded.

The download button 320 instructs the content distribution device 10 to execute downloading according to each wireless communication system, and includes a download button 321 for the wireless LAN and a download button 322 for TransferJet. When the download button 320 is pushed in a state in which the button 311 in the content list 310 is selected, a content file corresponding to content selected by the button 311 is downloaded from the content distribution device 10 to the content reception device 30 according to a wireless communication system corresponding to the selected download button. The two download buttons 321 and 322 are set to be not pushed at the same time.

A second wireless communication function memory card 120 is connected to the memory card I/F 11B. The second wireless communication function memory card 120 is one in which a memory card including a non-volatile memory such as an NAND flash memory as a storage medium has a function of capable of performing wireless communication according to a second wireless communication system. The second wireless communication function memory card 120 includes a second wireless communication unit 121, an antenna 122, and a data storage unit 123.

The second wireless communication unit 121 performs a wireless communication process with the content reception device 30 according to a second wireless communication system by which communication can be performed at a data transfer rate higher than a data transfer rate of the first wireless communication system. In the second wireless communication system, communication can be performed in a communication range smaller than a communication range of the first wireless communication system. In other words, in the first wireless communication system, communication can be performed in the communication range larger than the communication range of the second wireless communication system, and in the second wireless communication system, communication can be performed at the data transfer rate higher than the data transfer rate of the first wireless communication system. The second wireless communication system is preferably a wireless communication system having a communication range of several centimeters (cm) and a data transfer rate of 100 Mbps or higher. For example, TransferJet may be used as the second wireless communication system. A radio frequency used in TransferJet is 4.48 GHz, and a data transfer rate is 375 Mbps. In the following description, the second wireless communication system is assumed to be TransferJet.

When switching from the first wireless communication system to the second wireless communication system is performed, the second wireless communication unit 121 takes over information of a communication counterpart, a content file name being subject to data transfer, and a serial number of a transmitted packet from a communication information handover unit 136 of the controller 13 which will be described later, and indicates a packet to be transmitted to a file transceiving unit 135 of the controller 13 based on the information.

The antenna 122 transmits data generated by the second wireless communication unit 121 through a wireless signal of the second wireless communication system. Further, the antenna 122 receives the wireless signal of the second wireless communication system from the content reception device 30. As illustrated in FIG. 2, the antenna 122 is printed on the top surface of the second wireless communication function memory card 120.

The data storage unit 123 stores the content file. The stored content file is assumed to be the same as one stored in the first wireless communication function memory card 110. The content distribution screen data may or may not be stored in the data storage unit 123.

The controller 13 includes a communication authenticating unit 131, a communication switching unit 132, a file dividing unit 133, a packet number adding unit 134, the file transceiving unit 135, the communication information handover unit 136, and a control unit 137. The controller 13 is configured with one or more Central Processing Units (CPUs) and a peripheral circuit. The communication authenticating unit 131, the communication switching unit 132, the file dividing unit 133, the packet number adding unit 134, the file transceiving unit 135, and the communication information handover unit 136 are implemented by executing a program through the CPU.

The communication authenticating unit 131 performs a connection process by a designation of an SSID between the content distribution device 10 and the content reception device 30. The communication authenticating unit 131 acquires identification information (for example, a Media Access Control (MAC) address of a first wireless communication unit 31) of the content reception device 30 that is being connected through the first wireless communication system and an ID (hereinafter, "unique ID") and authentication information specific to a second wireless communication unit 33 of the content reception device 30. Then, the acquired information is associated and stored in a memory as terminal management information.

Figure 4:
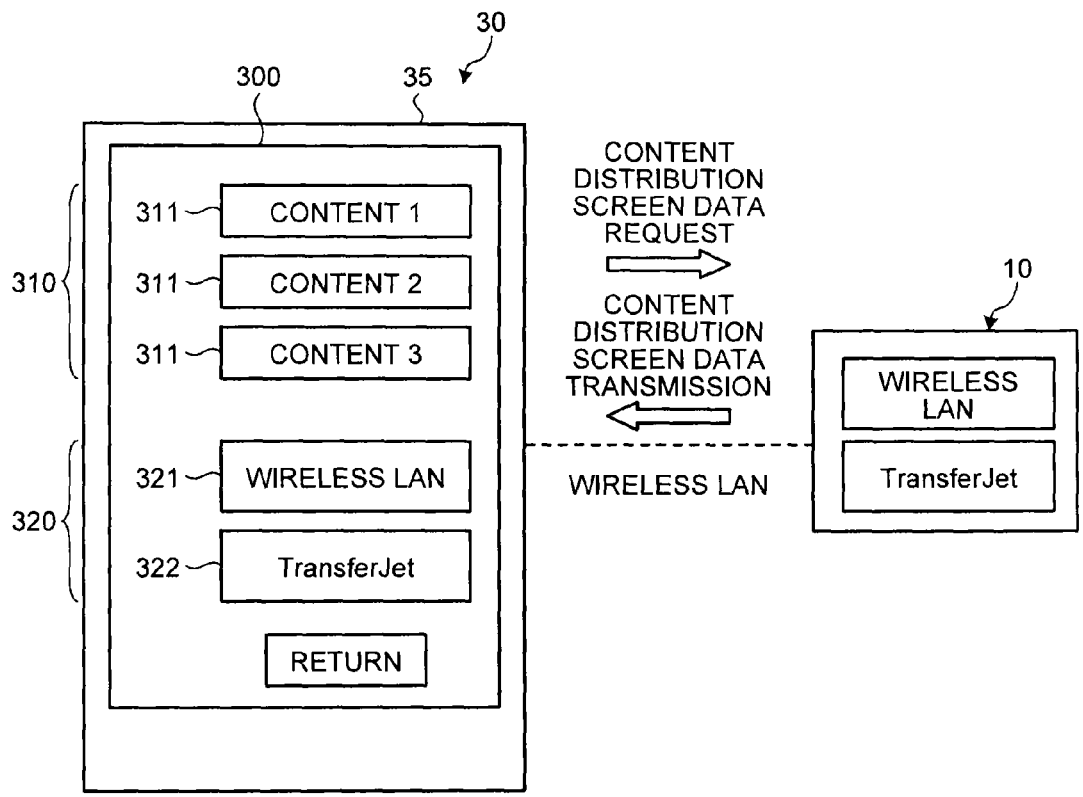
FIG. 4 is a diagram illustrating exemplary terminal management information.

FIG. 4 is a diagram illustrating exemplary terminal management information. The terminal management information includes the MAC address of the first wireless communication unit 31 of the content reception device 30 and the unique ID and the authentication information of the second wireless communication unit 33 as an item. One record is created for one content reception device 30 connected to the content distribution device 10.

It is preferable that the wireless LAN of the content distribution device 10 have a system connectable by any terminal. In this case, a connection to the wireless LAN can be performed such that a beacon signal including an SSID identifying a wireless LAN is output from the antenna 112, and the SSID included in the received beacon signal is designated by the content reception device 30.

Further, when the content reception device 30 enters a communication area, the communication authenticating unit 131 performs an authentication with the content reception device 30 using the acquired authentication information.

The communication switching unit 132 performs a switching process from the first wireless communication unit 111 to the second wireless communication unit 121 and a switching process from the second wireless communication unit 121 to the first wireless communication unit 111. The communication switching unit 132 detects that the content reception device 30 has moved from the communication area of the first wireless communication system to the communication area of the second wireless communication system, and performs switching from communication according to the first wireless communication system to communication according to the second wireless communication system when switching preparation is completed. Further, when the content reception device 30 is detected to have left the communication area of the second wireless communication system, the communication switching unit 132 performs switching from the communication according to the second wireless communication system to the communication according to the first wireless communication system.

The file dividing unit 133 divides the content files stored in the data storage units 113 and 123 into data packets (hereinafter, "packets") of a certain size used when data is transferred according to the second wireless communication system. For example, the content file is divided into packets having a size of 64 kBytes. It is because in TransferJet, a packet size that can be transmitted per once is 64 kBytes. Further, even when transmission is performed according to the first wireless communication system (the wireless LAN), the content file is similarly divided into packets of a certain size.

The packet number adding unit 134 adds packet numbers to the packets divided by the file dividing unit 133 in order starting from a leading packet configuring a file. Preferably, one indicating an order from a leading packet configuring a file is used as packet numbers, and, for example, a serial number or the like may be used. Further, one serial number may be added to one packet, and one serial number may be added to a plurality of packets.

Upon receiving an instruction to download the content file from the content reception device 30, the file transceiving unit 135 transmits the divided packets of the content file in a serial number order. When wireless communication is performed according to the first wireless communication system, the packets with the serial number serving as the content file in the data storage unit 113 are transferred to the first wireless communication unit 111. Further, when wireless communication is performed according to the second wireless communication system, the packets with the serial number serving as the content file in the data storage unit 123 are transferred to the second wireless communication unit 121.

When switching to the second wireless communication unit 121 is performed while the content file is being transmitted through the first wireless communication unit 111, the file transceiving unit 135 transfers the non-transmitted packets of the content file to the second wireless communication unit 121 based on the instruction given from the second wireless communication unit 121. Thus, the content file may not be transmitted from the beginning at the time of wireless communication switching. As a result, when the content file is transmitted, the content file can be efficiently transmitted using network resources effectively. The file transceiving unit 135 performs communication with the content reception device 30 according to a definition of an Object Exchange (OBEX) layer or a Small Computer System Interface (SCSI) layer.

When switching from the first wireless communication system to the second wireless communication system is performed, the communication information handover unit 136 causes the second wireless communication unit 121 to take over the handover information. The handover information includes a communication target, a content file name being transferred to the communication target, and a serial number of a transmitted packet. As the handover information is transferred to the second wireless communication unit 121, the second wireless communication unit 121 can perform transmission from a next packet non-transmitted to the communication target to which data has been transferred through the first wireless communication unit 111. As an embodiment, the handover information includes a number of a transmitted packet, but the handover information may include a number of a packet to be transmitted next.

The control unit 137 controls the content distribution device 10 in general. For example, an embedded CPU may be used as the control unit 137. The control unit 137 executes a distribution application in which a content distribution method described in the present embodiment is described.

The memory 14 stores data that is used for control by the controller 13. Various kinds of Random Access Memories (RAMs) may be used as the memory 14.

The content reception device 30 is a device that can receive content such as moving image data, image data, or music data from the content distribution device 10 and reproduce the content. Examples of the content reception device 30 include a smartphone, a tablet, a portable personal computer, a Personal Digital Assistant (PDA), a portable game machine, a portable music player, and a digital camera.

The content reception device 30 includes the first wireless communication unit 31, an antenna 32, the second wireless communication unit 33, an antenna 34, the display unit 35, a speaker 36, an input unit 37, a non-volatile storage unit 38, a controller 39, and a memory 40. The first wireless communication unit 31, the second wireless communication unit 33, the input unit 37, the non-volatile storage unit 38, the controller 39, and the memory 40 are connected with one another via a bus 47.

The first wireless communication unit 31 performs the wireless communication process with the content distribution device 10 according to the first wireless communication system. The antenna 32 transmits data generated by the first wireless communication unit 31 through the wireless signal of the first wireless communication system. Further, the antenna 32 receives the wireless signal of the first wireless communication system from the content distribution device 10. The second wireless communication unit 33 performs the wireless communication process with the content distribution device 10 according to the second wireless communication system. The antenna 34 transmits data generated by the second wireless communication unit 33 through the wireless signal of the second wireless communication system. Further, the antenna 34 receives the wireless signal of the second wireless communication system from the content distribution device 10.

The display unit 35 is a device that can display an image or a video. The speaker 36 is an audio output device that can output a sound.

The input unit 37 is an input device through which an input to the content reception device 30 is performed. The input unit 37 is configured with a button, a keyboard, and the like. The input unit 37 and the display unit 35 may be combined as a touch panel.

The non-volatile storage unit 38 stores a control program of controlling the content reception device 30, an application program executed by the content reception device 30, a content file received by the content distribution device 10, and the like.

The controller 39 includes a communication authenticating unit 391, a communication switching unit 392, a file transceiving unit 393, a file reconstructing unit 394, an image processing unit 395, an audio processing unit 396, and a control unit 397. The controller 39 is configured with one or more CPUs and a peripheral circuit. The communication authenticating unit 391, the communication switching unit 392, the file transceiving unit 393, the file reconstructing unit 394, the image processing unit 395, and the audio processing unit 396 are implemented by executing a program through the CPU.

For example, upon receiving the beacon signal from the content distribution device 10, the communication authenticating unit 391 transmits identification information of the first wireless communication unit 31 of the content reception device 30 and a unique ID and authentication information specific to the second wireless communication unit 33 to the content distribution device 10.

The communication switching unit 392 performs the switching process from the first wireless communication unit 31 to the second wireless communication unit 33 and the switching process from the second wireless communication unit 33 to the first wireless communication unit 31. When the content reception device 30 is detected to have moved from the communication area of the first wireless communication system to the communication area of the second wireless communication system or when the user gives an instruction to perform switching to the second wireless communication system, the communication switching unit 392 switches communication from the first wireless communication system to the second wireless communication system. Further, when the content reception device 30 is detected to have left the communication area of the second wireless communication system, the communication switching unit 392 switches communication from the second wireless communication system to the first wireless communication system.

In order to transmit and receive a file safely, the file transceiving unit 393 controls file transmission and reception of the first wireless communication unit 31 and the second wireless communication unit 33 through the control unit 397. At the time of transmission, for example, the file transceiving unit 393 reads data stored in the non-volatile storage unit 38 out to the memory 40, and transmits the data to the device of the communication counterpart through the first wireless communication unit 31 or the second wireless communication unit 33. At the time of reception, for example, the file transceiving unit 393 stores the packets received from the content distribution device 10 through the first wireless communication unit 31 or the second wireless communication unit 33 in the memory 40, and further stores the data in the non-volatile storage unit 38.

The file reconstructing unit 394 reconstructs the content file using the packets received through the first wireless communication unit 31 and the packets received through the second wireless communication unit 33. The reconstructed content file is stored in the non-volatile storage unit 38.

The image processing unit 395 causes image data, video data or the content distribution screen data, or the like to be displayed on the display unit 35. For example, the audio processing unit 396 outputs audio data of a downloaded content file to the speaker 36. Further, when the content file is video data, the image processing unit 395 and the audio processing unit 396 output moving image data and audio data based on a synchronous signal included in the content file.

The control unit 397 controls the content reception device 30 in general. For example, an embedded CPU may be used as the control unit 397. The memory 40 stores data that is used for control by the control unit 397. Various kinds of RAMs may be used as the memory 40.

Figure 5B:
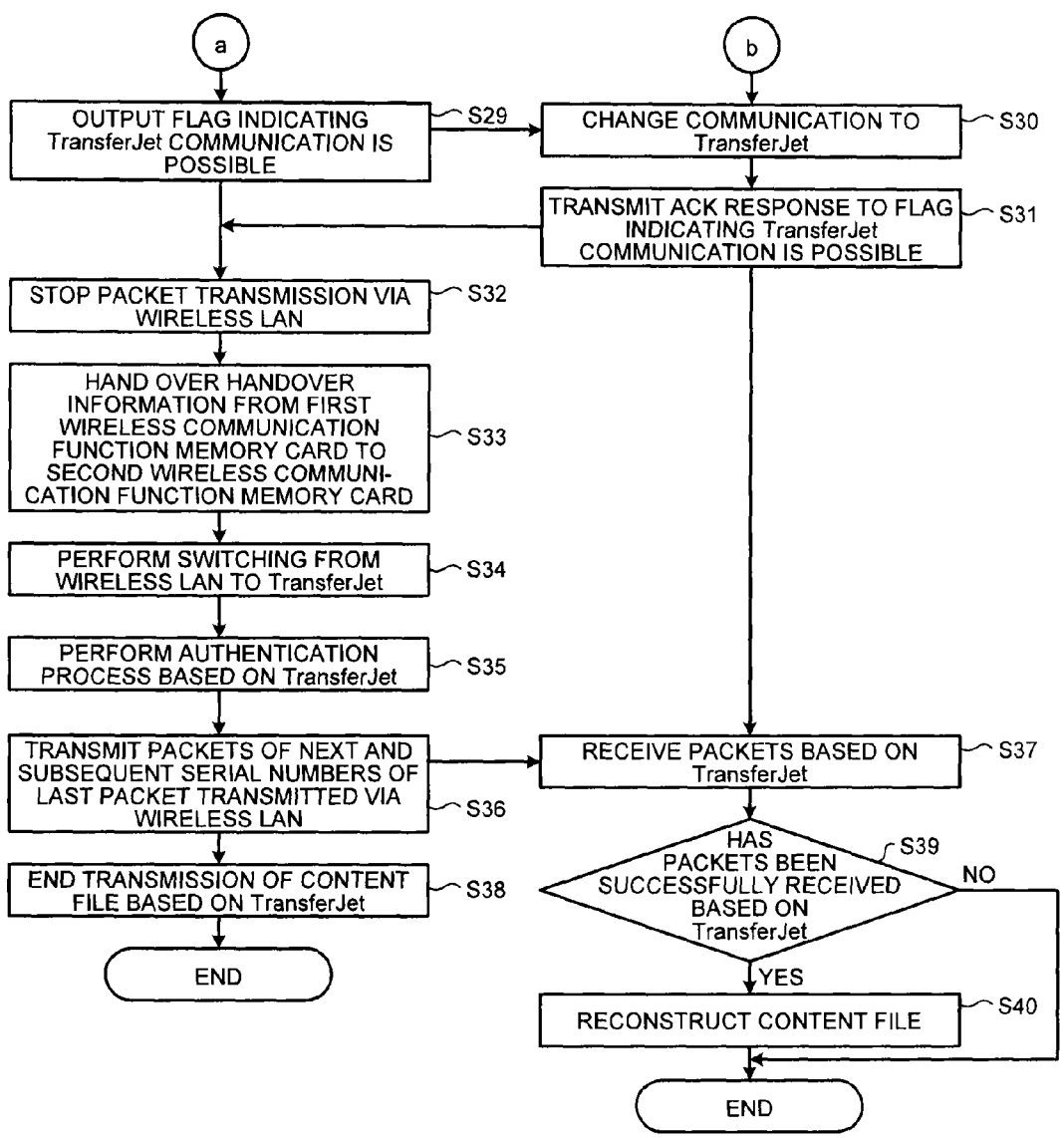

Next, a content distribution method in the content distribution system will be described. FIGS. 5A and 5B are flowcharts illustrating an exemplary procedure of a content distribution method according to the first embodiment.

First, the content distribution device 10 activates a content distribution program (step S11). The content distribution program is a program that transmits the content distribution screen data to the content reception device 30 in the communication area of the wireless LAN, and distributes selected content using the wireless LAN (the first wireless communication system) and TransferJet (the second wireless communication system). The first wireless communication unit 111 of the content distribution device 10 transmits the beacon signal through the antenna 112 (step S12).

When the content reception device 30 enters the communication area of the wireless LAN (step S13), a wireless communication establishment process of the wireless LAN is performed between the content distribution device 10 and the content reception device 30 (step S14). For example, when the content reception device 30 designates the SSID included in the beacon signal, the content reception device 30 is connected to the wireless LAN.

Then, the communication authenticating unit 391 of the content reception device 30 transmits the MAC address of the first wireless communication unit 31 and the unique ID and the authentication information of the second wireless communication unit 33 to the content distribution device 10 (step S15). The content distribution device 10 stores the MAC address of the first wireless communication unit 31 of the content reception device 30 and the unique ID and the authentication information of the second wireless communication unit 33 in the memory 14 as the terminal management information (step S16).

Thereafter, the content reception device 30 transmits a content distribution screen data transmission request to the content distribution device 10 (step S17). For example, this is performed as the connection of the wireless LAN is completed, and the content reception device 30 gives an instruction to perform a content distribution screen display process. The content distribution device 10 transmits the content distribution screen data from the first wireless communication function memory card 110 to the content reception device 30 (step S18). The content reception device 30 receives the content distribution screen data (step S19), and causes the content distribution screen data to be displayed on the display unit 35 (step S20). Thereafter, the user gives an instruction to download content (step S21).

As illustrated in FIG. 3, when the content reception device 30 is connected with the content distribution device 10 via the wireless LAN, and makes the content distribution screen data transmission request as described above, the content distribution screen data is transmitted from the content distribution device 10. Then, the content distribution screen 300 is displayed on the display unit 35 of the content reception device 30.

For example, when the button 311 of "content 1" is selected in the content distribution screen 300 of FIG. 3, and the download button 321 for the wireless LAN is pushed, an instruction to download "content 1" is transmitted from the content reception device 30 to the content distribution device 10.

Referring back to FIG. 5A, the file dividing unit 133 of the content distribution device 10 divides the content file into packets having a size of 64 kBytes (step S22). The packet number adding unit 134 adds a serial number to the divided packets in order from a leading packet (step S23). The division into the packets and the adding of the serial number are similarly performed in the data storage units 113 and 123.

Figure 6A:
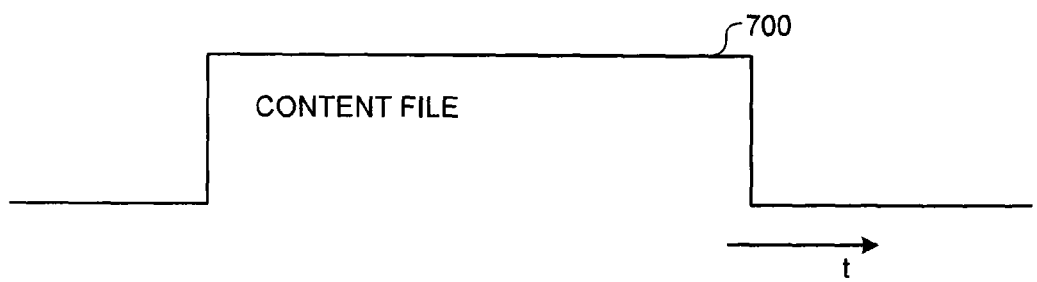
FIGS. 6A and 6B are diagrams schematically illustrating an exemplary content file division method performed by a file dividing unit.
Figure 6B:
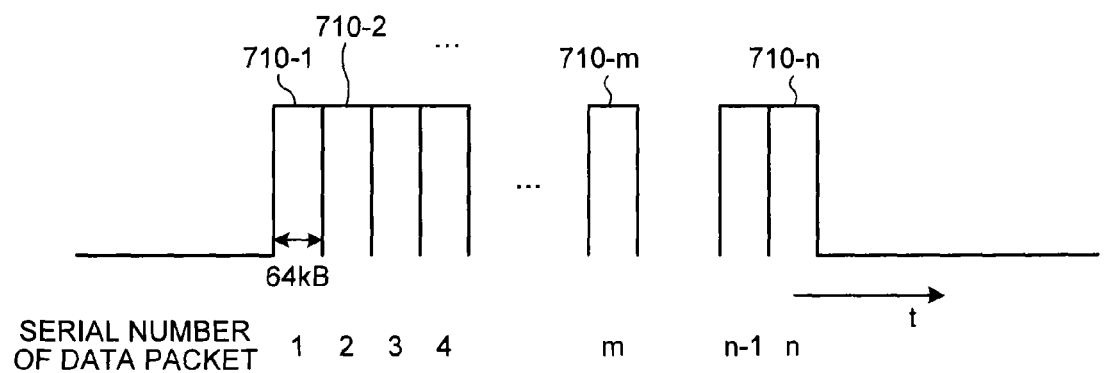

FIGS. 6A and 6B are diagrams schematically illustrating an exemplary content file division method by the file dividing unit. As illustrated in FIG. 6A, there is a content file 700 of a certain size. When the content file 700 is transmitted in the content distribution system according to the present embodiment, for example, the content file 700 is divided into packets having a size of 64 kBytes. The result is illustrated in FIG. 6B. Here, the content file 700 is divided in n (n is a natural number) packets 710-1 to 710-n. Then, serial numbers 1 to n are added to the packets in order from the leading packet 710-1.

The process of dividing the content file 700 into the packets 710-1 to 710-n and adding the serial numbers may be executed after the instruction to download the content in step S21 is given or may be executed after the process of activating the content distribution program in step S11. It is because each time the instruction to download the content file 700 is received, the same packets 710-1 to 710-n are transmitted, and thus data transfer can be smoothly performed by prior preparation.

Then, the file transceiving unit 135 of the content distribution device 10 transfers the packets to the first wireless communication unit 111 so that communication according to the OBEX layer or the SCSI layer is performed. The first wireless communication unit 111 transmits the packets to the content reception device 30 via the wireless LAN in the serial number order (step S24). Further, the first wireless communication unit 111 stores the content file name of the transmission target and the serial numbers of the transmitted packets (step S25).

The content reception device 30 receives the packets through the first wireless communication unit 31 (step S26), and temporarily stores the received packets in the memory 40. When the communication is performed via the wireless LAN, the data transfer rate depends on the number of terminals connected to the wireless LAN but is, for example, 20 Mbps to 30 Mbps.

Thereafter, the content reception device 30 is assumed to have entered the communication area of TransferJet (step S27). Specifically, the user is assumed to cause the content reception device 30 to come into contact with the antenna 122 of the content distribution device 10. In this case, the communication authenticating unit 131 of the content distribution device 10 detects that the content reception device 30 has entered the communication area of the second wireless communication system through the antenna 122 (step S28). Then, the communication authenticating unit 131 of the content distribution device 10 outputs a flag indicating that communication can be performed according to TransferJet (step S29). Thereafter, the content distribution device 10 enters a standby state.

Thereafter, the communication switching unit 392 of the content reception device 30 changes communication to TransferJet according to the instruction given by the user (step S30). For example, this is performed such that the download button 322 for TransferJet is pushed down in the content distribution screen 300 of FIG. 3. As a result, information indicating that the communication has been changed to TransferJet is displayed on the content distribution screen 300. At this time, a confirm button by which the user confirms whether or not switching to TransferJet is performed may be displayed on the content distribution screen 300. Then, the first wireless communication unit 31 of the content reception device 30 transmits an ACK response on the flag indicating that communication can be performed according to TransferJet (step S31).

Upon receiving the ACK response, the communication switching unit 132 of the content distribution device 10 stops transmission of the packets via the wireless LAN (step S32). Then, the communication information handover unit 136 of the content distribution device 10 performs a handover process of transferring the handover information indicating a communication target to which data is being transferred, a transfer target, and a data transfer state from the first wireless communication function memory card 110 to the second wireless communication function memory card 120 (step S33). Specifically, the communication information handover unit 136 acquires the MAC address, the unique ID, and the authentication information identifying the communication target from the terminal management information, and acquires a transfer content file name serving as a transfer target and a serial number of a transmitted packet serving as a data transfer state from the first wireless communication unit 111. Then, the handover information including the above information is transferred to the second wireless communication unit 121.

The communication switching unit 132 of the content distribution device 10 switches wireless communication from the wireless LAN to TransferJet (step S34). Then, the communication authenticating unit 131 of the content distribution device 10 determines whether or not the unique ID of the content reception device 30 is identical to the unique ID included in the handover information. When the two unique IDs are identical to each other, it indicates that the content reception device 30 is identical to the terminal to which a part of the content file has been transferred via the wireless LAN. Further, the process of authenticating the content reception device 30 is performed using the authentication information included in the handover information (step S35).

Thereafter, the file transceiving unit 135 of the content distribution device 10 transfers the packets to the second wireless communication unit 121 so that the communication according to the OBEX layer or the SCSI layer is performed. The second wireless communication unit 121 transmits a packet of a next serial number to the content reception device 30 according to TransferJet with reference to the serial number of the transmitted packet included in the handover information (step S36).

The second wireless communication unit 33 of the content reception device 30 receives the packets according to TransferJet (step S37). At this time, a progress bar indicating a download progress state may be displayed on the display unit 35 of the content reception device 30. The data transfer rate of TransferJet is 375 Mbps, and about 10 times as higher as the data transfer rate of the wireless LAN. Thus, a period of time taken to download a packet is reduced to be 1/10 of that of the wireless LAN.

Figure 7A:
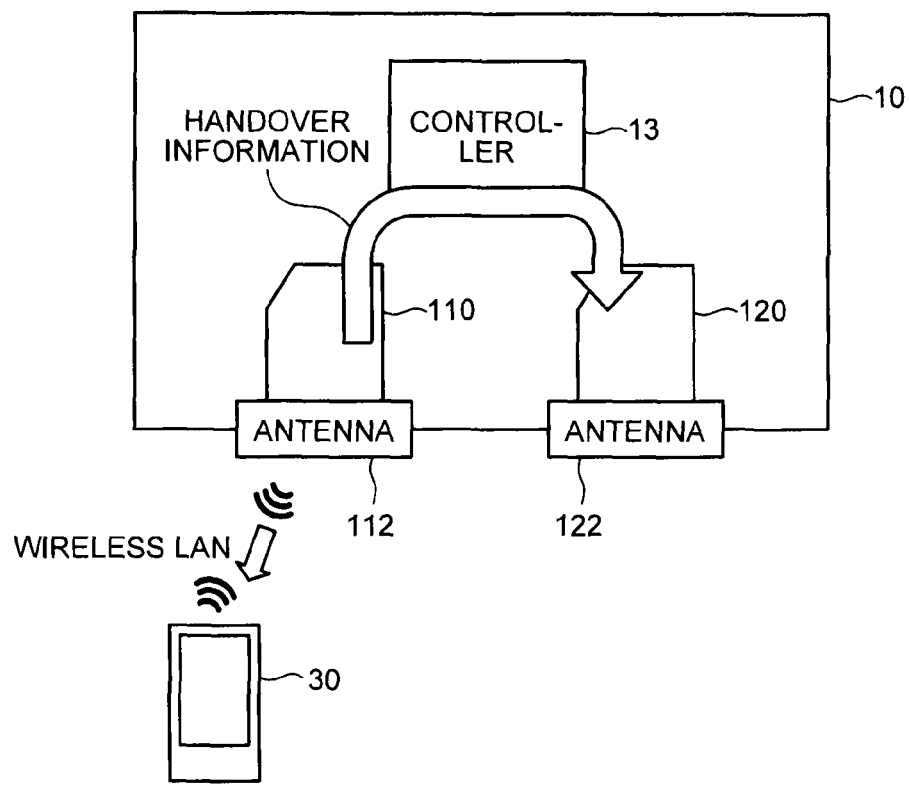
FIGS. 7A and 7B are diagrams schematically illustrating states in which a wireless communication system is switched.
Figure 7B:
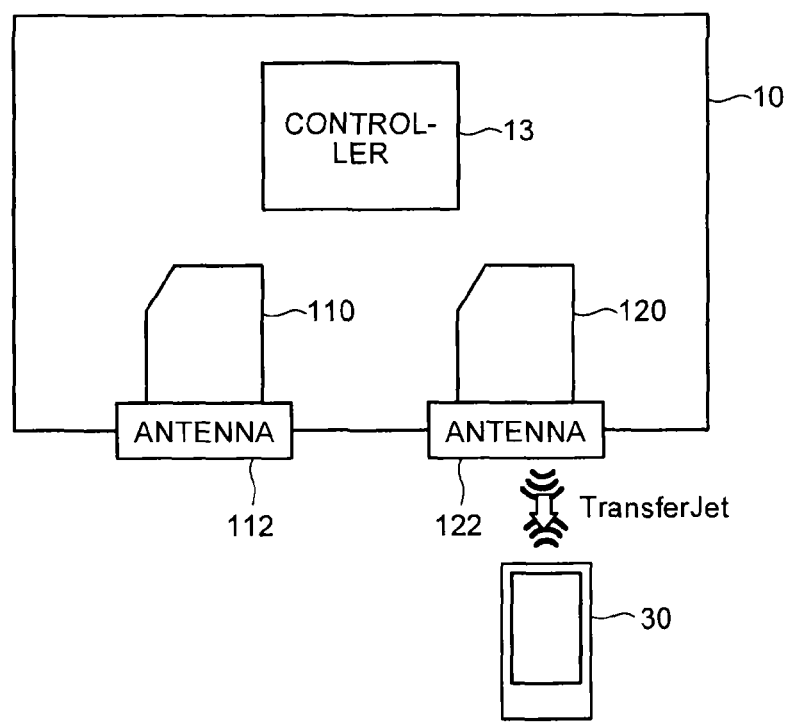

FIGS. 7A and 7B are diagrams schematically illustrating states in which the wireless communication system is switched. FIG. 7A illustrates a state in which the content reception device 30 downloads data from the content distribution device 10 via the wireless LAN. At this time, a unit is a divided packet. Then, when the content reception device 30 performs wireless communication with the content distribution device 10 according to TransferJet, the handover information is handed over from the first wireless communication function memory card 110 to the second wireless communication function memory card 120 in the content distribution device 10. Thereafter, the content reception device 30 downloads data from the content distribution device 10 according to TransferJet as illustrated in FIG. 7B.

When the second wireless communication unit 121 of the content distribution device 10 ends transmission of all packets (step S38), the data distribution process at the content distribution device 10 side ends.

Meanwhile, the second wireless communication unit 33 of the content reception device 30 determines whether or not the packets have been successfully received (step S39). When the packets have been successfully received (Yes in step S39), the file reconstructing unit 394 reconstructs the content file using the packets temporarily stored in the memory 40 (step S40). Then, the data distribution process at the content reception device 30 side ends.

However, when the packets fail to be received (No in step S39), the process ends without acquiring the content file. For example, the packets are recognized not to be received when the user causes the content reception device 30 to be apart from the antenna 122 for a certain period of time so that communication is hardly performed at the time of packet downloading according to TransferJet. In this case, instead of causing communication not to be performed, switching to the wireless LAN is performed again, and the remaining packets that are not downloaded may be downloaded via the wireless LAN. In this case, as another method, instead of causing communication not to be performed, when the file size of the remainder of the content file is larger than a certain size, a connection according to TransferJet may be performed again, and all packets may be downloaded according to TransferJet from the beginning of the content file.

Figure 8:
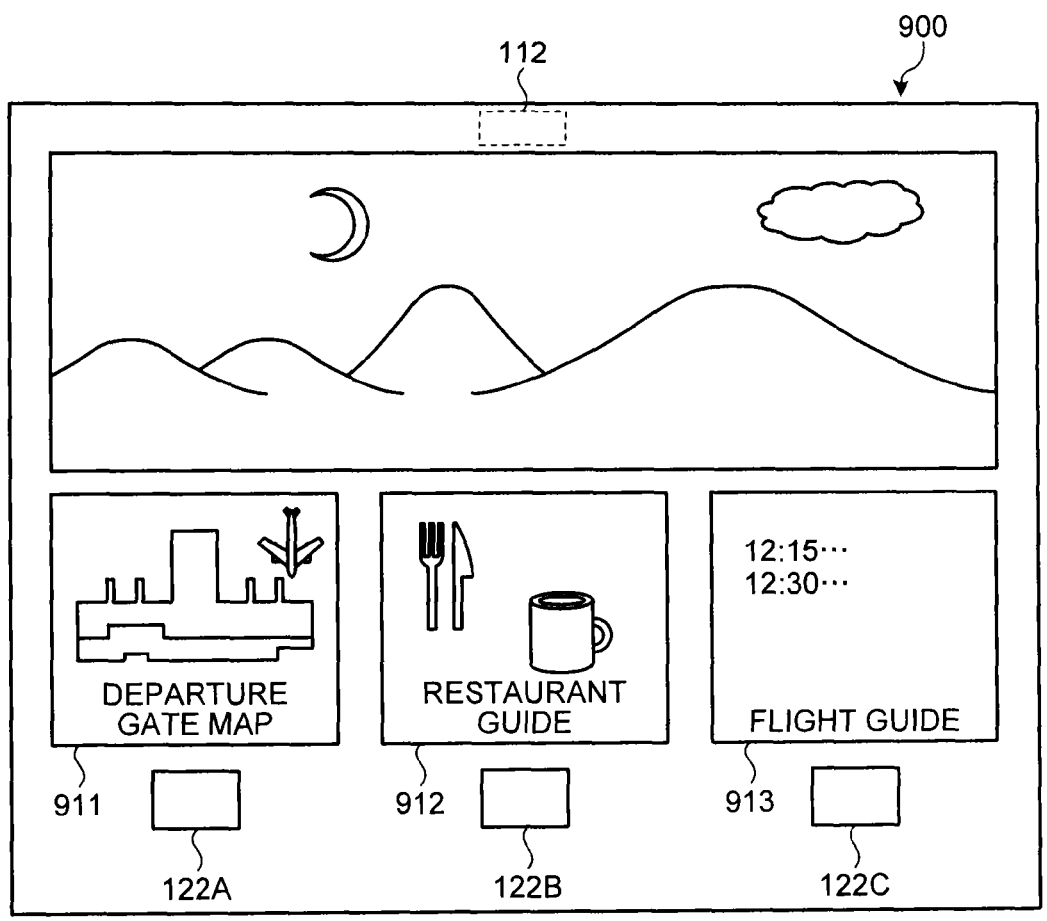
FIG. 8 is a diagram illustrating an example of the content distribution system according to the first embodiment.

FIG. 8 is a diagram illustrating an example of the content distribution system according to the first embodiment. FIG. 8 illustrates an example in which the content distribution device 10 is applied to a digital signage arranged in an airport. For example, the antenna 112 for performing communication according to the wireless LAN is installed on an upper portion of a digital signage 900. Further, a plurality of display units 911 to 913 are installed near the center of the digital signage 900 in a height direction. Here, the display unit 911 for a departure gate map, the display unit 912 for a restaurant guide, and the display unit 913 for a flight guide are installed. In other words, the content files for the departure gate map, the restaurant guide, and the flight guide are prepared in the digital signage 900. Further, antennas 122A to 122C for performing communication according to TransferJet are installed on a lower portion of the display units 911 to 913.

A user 950 has a smartphone 960 serving as the content reception device 30. When the user 950 enters the communication area of the wireless LAN of the digital signage 900, the smartphone 960 is connected with the digital signage 900 via the wireless LAN. For example, when the user 950 desires to acquire the restaurant guide among content, the user 950 gives an instruction to download the restaurant guide according to the above-described method. When the smartphone 960 is apart from the digital signage 900, the content file is downloaded via the wireless LAN. However, for example, when the user 950 approaches the digital signage 900, and makes the smartphone 960 come into contact with the antenna 122B installed below the display unit 912 for the restaurant guide, wireless communication is switched from the wireless LAN to TransferJet, and the content file is downloaded at the data transfer rate of 375 Mbps.

In the above description, when switching from the first wireless communication system to the second wireless communication system is performed, the packet transmitted according to the first wireless communication system and the packet transmitted according to the second wireless communication system serving as the handover information do not overlap. However, when the content file is divided into packets, for example, when the packet numbers are added as the serial numbers, and there are packets of the same packet numbers, the overlapping packets may be excluded at the time of reconstruction. Thus, some packets transmitted according to the first wireless communication system may overlap some packets transmitted according to the second wireless communication system.

According to the first embodiment, the content distribution device 10 are equipped with the first wireless communication function memory card 110 and the second wireless communication function memory card 120, the content file is divided into packets of a certain size, and the serial numbers are added in order from the leading packet of the content file. When the content reception device 30 is connected to the content distribution device 10 according to the first wireless communication system, the content reception device 30 transmits the identification information of the first wireless communication unit 31 and the second wireless communication unit 33 and the authentication information used by the second wireless communication system to the content distribution device 10 as the terminal management information. When switching to the second wireless communication system is performed while the content file is being downloaded according to the first wireless communication system, the handover information including the content file name of the download target, the serial numbers of the packets transmitted until that time, and the terminal management information are handed over from the first wireless communication function memory card 110 to the second wireless communication function memory card 120. Thus, the content reception device 30 can download the rest of data downloaded according to the first wireless communication system according to the second wireless communication system. As a result, there is an effect of downloading efficiently without wasting the data downloaded until that time according to the first wireless communication system. Further, as the data transfer rate of the second wireless communication system is made faster than that of the first wireless communication system, a downloading period of time can be reduced.

Further, as the wireless communication function memory card is mounted, the content distribution device 10 can perform wireless communication according to various wireless communication systems. Thus, when the wireless communication system is improved or when a new wireless communication system is developed, an improved wireless communication function memory card or a new wireless communication function memory card is preferably mounted. In other words, when it is desired to employ a different wireless communication system, it is desirable to replace only a memory card without replacing the entire content distribution device 10. Thus, there is also an effect of using the content distribution device 10 for a longer period of time.

Second Embodiment

When TransferJet is used as the second wireless communication system, one-way data transfer is basically performed in order to implement high-speed data transfer. Thus, when a packet is not received, it is difficult to transmit the serial number of the corresponding packet from the content reception device to the content distribution device side and receive a non-received packet again. The second embodiment will be described in connection with a content distribution device capable of coping with a case in which a packet is not received.

Figure 9:
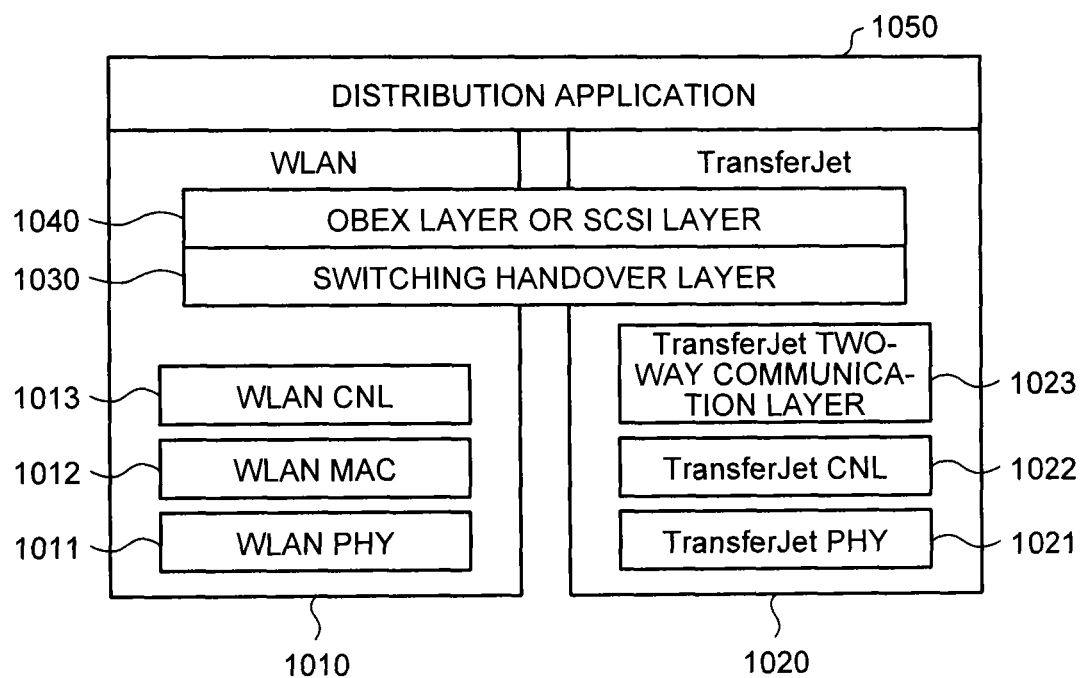
FIG. 9 is a diagram schematically illustrating an exemplary software stack of an application executed by a content distribution device according to a second embodiment.

FIG. 9 is a diagram schematically illustrating an exemplary software stack of an application executed by a content distribution device according to a second embodiment. A stack processed according to the first wireless communication system and a stack processed according to the second wireless communication system are arranged in parallel. In the second embodiment, the first wireless communication system is assumed to be the wireless LAN, and the second wireless communication system is assumed to be TransferJet.

A WLAN stack 1010 includes a WLAN physical layer 1011, a WLAN MAC layer 1012, and a WLAN connection layer 1013 that are sequentially stacked upward. For example, the WLAN physical layer 1011 specifies electrical characteristics necessary for performing wireless communication at a 2.4 GHz band or a 5 GHz band. The WLAN MAC layer 1012 specifies an access control method on a medium and a method of checking whether or not wireless transmission has been properly performed. The WLAN connection layer 1013 is wireless connected with a communication counterpart, controls such that a stable connection is maintained without being disconnected, and checks a packet exchange state.

A TransferJet stack 1020 includes a TransferJet physical layer 1021, a TransferJet connection layer 1022, and a TransferJet two-way communication layer 1023 that are sequentially stacked upward. The TransferJet physical layer 1021 converts data received from the TransferJet connection layer 1022 into a wireless signal that can be transmitted and received through an antenna. The TransferJet connection layer 1022 controls a one-to-one connection establishment and data transfer. The TransferJet two-way communication layer 1023 is a layer through which two-way communication can be performed according to TransferJet. Through this layer, for example, when there is a serial number of a non-received packet in the content reception device 30, the content reception device 30 can request the content distribution device 10 side to transmit the packet of the corresponding serial number.

A switching handover layer 1030 is arranged to straddle the WLAN stack 1010 and the TransferJet stack 1020. The switching handover layer 1030 hands over the handover information from the WLAN stack 1010 to the TransferJet stack 1020 so that a communication path of the content reception device 30 that is downloading is changed from the first wireless communication unit 31 to the second wireless communication unit 33.

An OBEX layer or SCSI layer 1040 is arranged above the switching handover layer 1030. The OBEX layer and the SCSI layer specify a file transfer method. A distribution application layer 1050 is arranged above the OBEX layer or SCSI layer 1040. The distribution application layer 1050 is an application layer that organizes the whole application.

The WLAN stack 1010 corresponds to processing of the first wireless communication unit 111, and the TransferJet stack 1020 corresponds to processing of the second wireless communication unit 121. Processing of the switching handover layer 1030 corresponds to processing of the communication information handover unit 136. Processing of the OBEX layer or SCSI layer 1040 corresponds to processing of the file transceiving unit 135.

For example, the content reception device 30 is assumed to approach by a distance to come into contact with the antenna 122 of the second wireless communication function memory card 120 of the content distribution device 10 as illustrated in FIG. 7B. In this case, high-speed communication using TransferJet can be performed. At this time, the content distribution device 10 is assumed to have transmitted up to a packet of a serial number m (m is an integer equal to or larger than 1 and equal to or less than n). Thus, the handover information having the serial number m of the packet is transmitted from the WLAN stack 1010 to the TransferJet stack 1020 through the switching handover layer 1030. Then, the handover information is shared by the second wireless communication unit 121 of the content distribution device 10 and the second wireless communication unit 33 of the content reception device 30 through the TransferJet two-way communication layer 1023 of the TransferJet stack 1020. Thus, the second wireless communication unit 121 performs transmission from a packet of a serial number (m+1).

After the data transfer according to the second wireless communication system ends, when a serial number is missing, a notification of a serial number that is requested to be retransmitted is given from the second wireless communication unit 33 of the content reception device 30 to the second wireless communication unit 121 of the content distribution device 10 through the TransferJet two-way communication layer 1023.

The example in which TransferJet is used as the second wireless communication system has been described, but in the case of the second wireless communication system providing only the other one-way communication, a similar two-way communication layer may be arranged above a layer corresponding to the data link layer.

In the second embodiment, the two-way communication layer is arranged above the layer corresponding to the data link layer of the stack processed by the second wireless communication system. Thus, there is an effect of requesting retransmission of a missing packet even through the second wireless communication system in which data transfer of only one-way communication is performed. Further, when the wireless system is switched, the content distribution device 10 and the content reception device 30 can share information of a serial number of a packet to be transmitted next.

Third Embodiment

The first embodiment has been described in connection with the example in which the content distribution device is equipped with the two memory card I/Fs, and the two memory card I/Fs are equipped with different wireless communication function memory cards, respectively. A third embodiment will be described in connection with an example in which one wireless communication function memory card is provided with a plurality of wireless communication functions.

Figure 10:
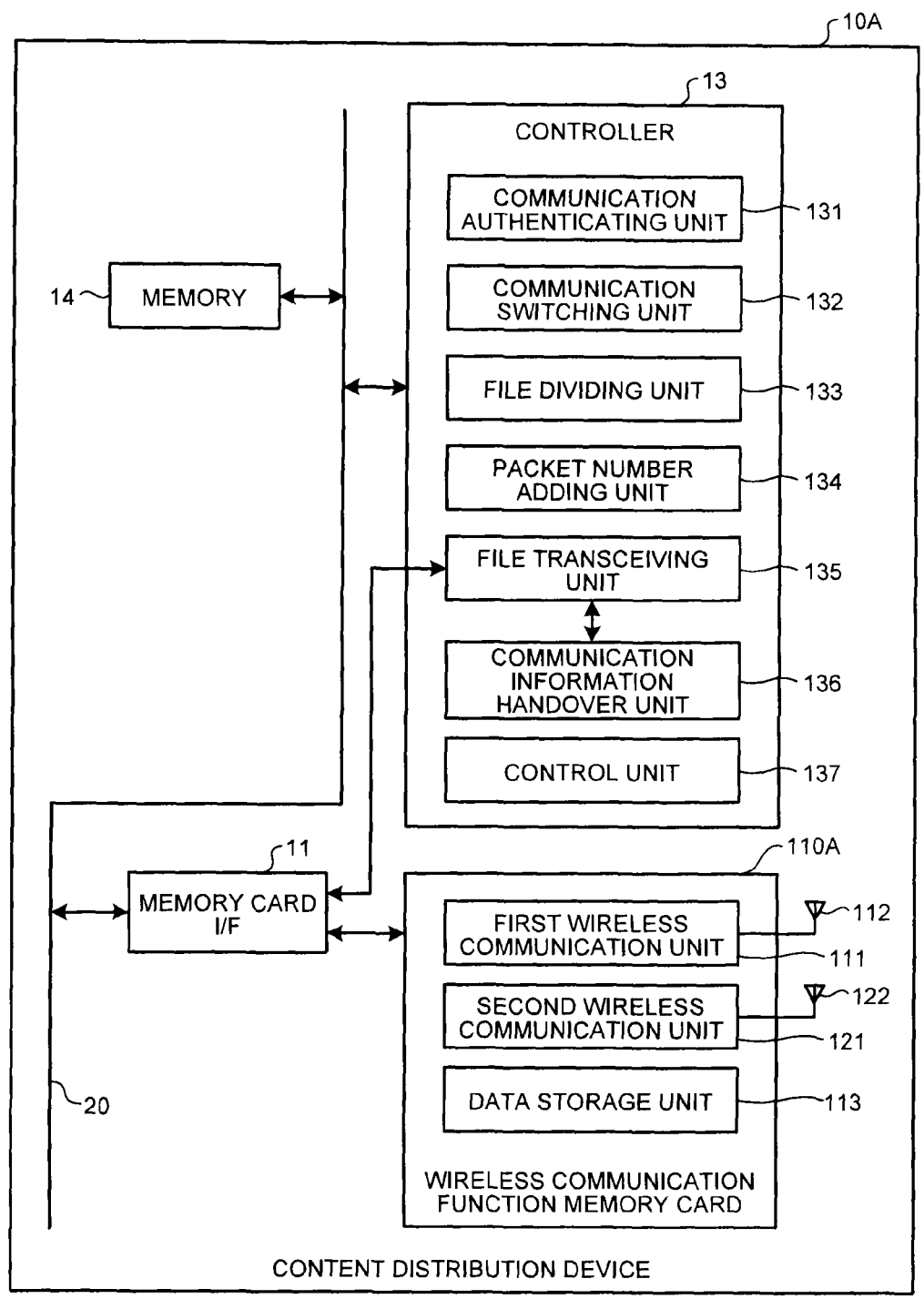
FIG. 10 is a block diagram schematically illustrating an exemplary configuration of a content distribution device according to a third embodiment.

FIG. 10 is a block diagram schematically illustrating an exemplary configuration of a content distribution device according to a third embodiment. A content distribution device 10A differs from the content distribution device 10 according to the first embodiment in that it is equipped with one memory card I/F 11.

A wireless communication function memory card 110A capable of performing wireless communication according to two wireless communication systems is connected to the memory card I/F 11. The wireless communication function memory card 110A includes a first wireless communication unit 111, an antenna 112, a second wireless communication unit 121, an antenna 122, and a data storage unit 113. The same components as those described in the first embodiment are denoted by the same reference numerals, and thus a description thereof will be omitted.

The wireless communication function memory card 110A may have the same size as or a different size from the wireless communication function memory cards 110 and 120 described in the first embodiment. In this case, one memory card insertion slot is formed in a housing of the content distribution device 10A.

A content distribution method using the content distribution device 10A is the same as that described in the first embodiment, and thus a description thereof is omitted.

According to the third embodiment, the same effects as in the first embodiment can be obtained.

Fourth Embodiment

The third embodiment has been described in connection with the example in which one wireless communication function memory card is provided with a plurality of wireless communication functions. A fourth embodiment will be described in connection with an example in which one wireless communication function memory card has a function necessary to implement the content distribution device.

Figure 11:
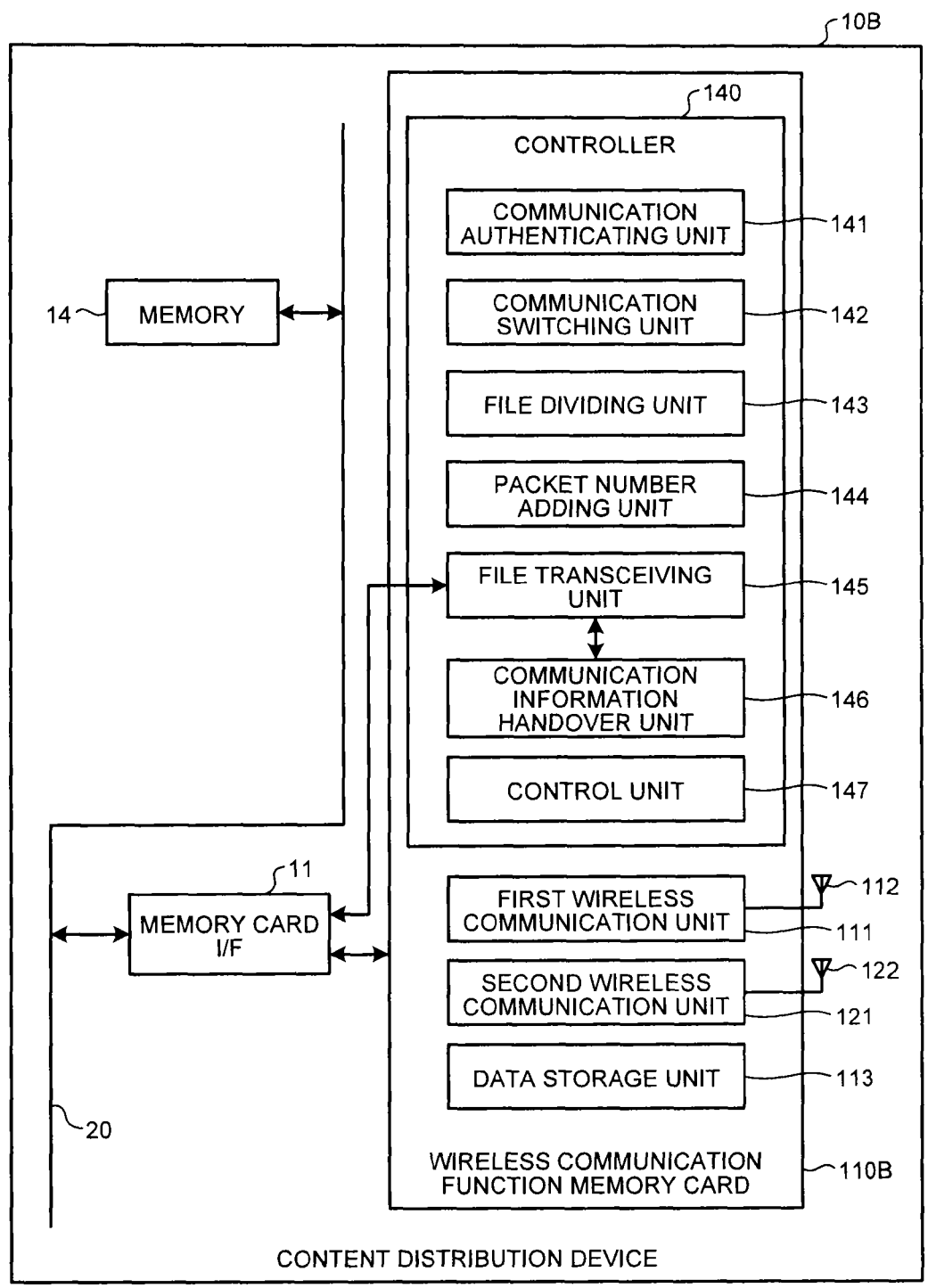
FIG. 11 is a block diagram schematically illustrating an exemplary configuration of a content distribution device according to a fourth embodiment.

FIG. 11 is a block diagram schematically illustrating an exemplary configuration of a content distribution device according to the fourth embodiment. A content distribution device 10B has a configuration in which the functions of the communication authenticating unit 131, the communication switching unit 132, the file dividing unit 133, the packet number adding unit 134, the file transceiving unit 135 and the communication information handover unit 136 are removed from the controller 13 in the content distribution device 10A according to the third embodiment, and the functions are added to a wireless communication function memory card 110B.

In other words, the wireless communication function memory card 110B according to the fourth embodiment includes a first wireless communication unit 111, an antenna 112, a second wireless communication unit 121, an antenna 122, a data storage unit 113, and a controller 140. The controller 140 includes functional blocks such as a communication authenticating unit 141, a communication switching unit 142, a file dividing unit 143, a packet number adding unit 144, a file transceiving unit 145, a communication information handover unit 146, and a control unit 147. The respective processing units are configured with software. The controller 140 has the same function as the controller 13 described in the first to third embodiments, and thus a description thereof is omitted.

In the fourth embodiment having the above configuration, the distribution of the content reception device 30 of the content file through the first wireless communication unit 111 and the second wireless communication unit 121 installed in the content distribution devices 10 and 10A in the first to third embodiments is executed by the controller 140 of the wireless communication function memory card 110B. The same components as in the above embodiments are denoted by the same reference numerals, and thus a description thereof is omitted. A content distribution method using the content distribution device 10B is the same as that described in the first embodiment, and thus a description thereof is omitted.

According to the fourth embodiment, the same effects as in the first embodiment can be obtained.

Fifth Embodiment

In the first embodiment, the first wireless communication unit, the second wireless communication unit, and the data storage unit are included in the wireless communication function memory card. A fifth embodiment will be described in connection with an example in which the first wireless communication unit, the second wireless communication unit, and the data storage unit are installed in the content distribution device.

Figure 12:
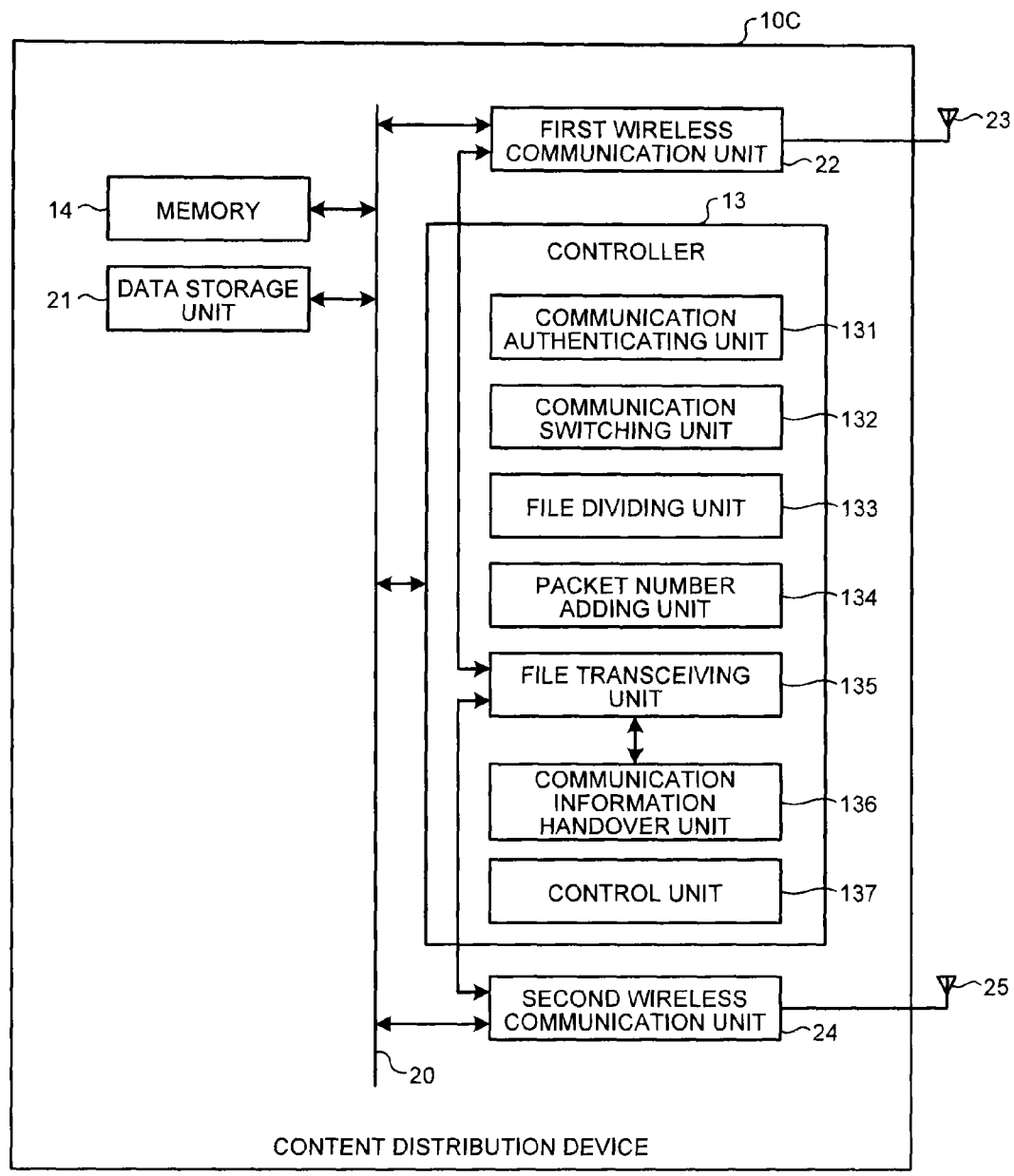
FIG. 12 is a block diagram schematically illustrating an exemplary configuration of a content distribution device according to a fifth embodiment.

FIG. 12 is a block diagram schematically illustrating an exemplary configuration of a content distribution device according to the fifth embodiment. A content distribution device 100 has a configuration in which the memory card I/Fs 11A and 11B are removed from the content distribution device 10 according to the first embodiment, and a data storage unit 21, a first wireless communication unit 22, and a second wireless communication unit 24 are connected to one another via a bus 20. An antenna 23 is connected to the first wireless communication unit 22, and an antenna 25 is connected to the second wireless communication unit 24.

The data storage unit 21 has the same function as the data storage units 113 and 123 according to the first embodiment, and is configured with a non-volatile storage device such as an NAND flash memory or a magnetic disk. The first wireless communication unit 22 and the antenna 23 have the same functions as the first wireless communication unit 111 and the antenna 112 according to the first embodiment, and the second wireless communication unit 24 and the antenna 25 have the same functions as the second wireless communication unit 121 and the antenna 122 according to the first embodiment. The same components as in the first embodiment are denoted by the same reference numerals, and thus a description thereof is omitted. A content distribution method using the content distribution device 100 is the same as that described in the first embodiment, and thus a description thereof is omitted.

In the fifth embodiment, the first wireless communication unit 22, the antenna 23, the second wireless communication unit 24, the antenna 25, and the data storage unit 21 are installed directly in the content distribution device 100. In this case, it is difficult to replace the first wireless communication unit 22, the antenna 23, the second wireless communication unit 24, and the antenna 25 as in the first embodiment, but it is possible to download the rest of data downloaded according to the first wireless communication system according to the second wireless communication system. As a result, there is an effect of downloading efficiently without wasting the data downloaded until that time according to the first wireless communication system. Further, as the data transfer rate of the second wireless communication system is made faster than that of the first wireless communication system, a downloading period of time can be reduced.

Further, in FIG. 12, the first wireless communication unit 22 and the antenna 23 may be configured as a first wireless communication adaptor, the second wireless communication unit 24 and the antenna 25 may be configured as a second wireless communication adaptor, and the first and second wireless communication adaptors may be detachably attached to the content distribution device 100. In this case, for example, the first wireless communication adaptor and the second wireless communication adaptor may have a configuration equipped with a Universal Serial Bus (USB) connector or a micro USB connector. Further, a USB port or a micro USB port may be formed in the content distribution device 100. Through this configuration, when it is desired to employ a different wireless communication system, it is preferably to replace only the wireless communication adaptor without replacing the entire content distribution device 100. As a result, there is an effect of increasing the lifespan of the content distribution device 100 without influencing the wireless communication system.

The content distribution devices 10 and 10A to 100 according to the present embodiment are equipped with a control device such as a CPU, a storage device such as a Read Only Memory (ROM) or a RAM, an external storage device such as a Hard Disk Drive (HDD), a Solid State Drive (SSD), and a Compact Disc (CD) derive device, a display device, and an input device such as a keyboard and a mouse, and has a hardware configuration using a typical computer.

The content distribution method executed by the content distribution device according to the present embodiment is provided as a program. The program is recorded in a computer readable recording medium such as a CD-ROM, a flexible disk (FD), a CD-R, a Digital Versatile Disk (DVD), or a memory card in a file of an installable format or an executable format and provided.

Further, the program executed by the content distribution device according to the present embodiment may be configured to be provided such that the program is stored in a computer connected to a network such as the Internet and then downloaded via a network. Further, the program executed by the content distribution device according to the present embodiment may be configured to be provided or distributed via a network such as the Internet.

Further, the program executed by the content distribution device according to the present embodiment may be configured to be embedded in a ROM or the like in advance and provided.

The program executed by the content distribution device according to the present embodiment has a module configuration including the above-described respective units (the communication authenticating unit 131, the communication switching unit 132, the file dividing unit 133, the packet number adding unit 134, the file transceiving unit 135, and the communication information handover unit 136), and actual hardware is configured such that as the CPU (processor) reads the program from the storage medium and executes the read program, the respective units are loaded onto a main storage device, and the communication authenticating unit 131, the communication switching unit 132, the file dividing unit 133, the packet number adding unit 134, the file transceiving unit 135, and the communication information handover unit 136 are generated on the main storage device.

The example in which the communication switching unit 132 and the file dividing unit 133 of the content distribution devices 10, 10A, and 10C and the communication switching unit 142 and the file dividing unit 143 of the content distribution device 10B are implemented by software has been described above. However, the communication switching unit 132 and the file dividing unit 133 or the communication switching unit 142 and the file dividing unit 143 may be configured with hardware such as a communication switching circuit and a file dividing circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A content distribution device comprising:
a first connecting unit that is connectable to a first storage device including a first antenna and a first wireless communication unit that performs data communication with a content reception device through the first antenna based on a first wireless communication system;
a second connecting unit that is connectable to a second storage device including a second antenna and a second wireless communication unit that performs data communication with the content reception device through the second antenna based on a second wireless communication system, the first wireless communication system enabling communication to be performed in a communication range larger than a communication range of the second wireless communication system, the second wireless communication system enabling communication to be performed at a data transfer rate higher than a data transfer rate of the first wireless communication system; and
a controller configured to distribute a distribution data file to the content reception device,
wherein the controller is configured to
  divide the distribution data file into a plurality of packets,
  add first information indicating packet numbers in a transmission order,
  transmit the packets having the first information,
    switch communication with the content reception device from the first wireless communication system to the second wireless communication system while transmitting the distribution data file to the content reception device, and
    hand over second information indicating the packet number to the second wireless communication unit when the communication with the content reception device is switched from the first wireless communication system to the second wireless communication system, and
the second wireless communication unit transmits the packets from a middle of the transmission order based on the handed over second information to the content reception device.

2. The content distribution device according to claim 1, wherein the controller is configured to further acquire terminal identification information including first identification information that is stored in the content reception device and used when communication based on the first wireless communication system is performed and second identification information used when communication based on the second wireless communication system is performed through the communication based on the first wireless communication system after communication with the content reception device is established based on the first wireless communication system, and
the second information includes the terminal identification information in addition to the packet numbers.

3. The content distribution device according to claim 2, wherein the second wireless communication unit determines whether or not identification information is identical to the second identification information included in the second information, the identification information being acquired from a terminal that is in a communicable state based on the second wireless communication system, and
the controller performs switching from the first wireless communication system to the second wireless communication system when the identification information is identical to the second identification information.

4. The content distribution device according to claim 1, wherein the second wireless communication unit performs data communication with the content reception device using a two-way communication layer in which two-way data communication is performed, the two-way communication layer being arranged above a connection layer in which one-way data communication based on the second wireless communication system is performed.

5. The content distribution device according to claim 4, wherein when a retransmission request is received from the content reception device using the two-way communication layer, the second wireless communication unit retransmits the packet having a packet number included in the retransmission request.

6. The content distribution device according to claim 4, wherein when switching to the second wireless communication system is performed, the second wireless communication unit shares the packet number included in the second information with the content reception device using the two-way communication layer.

7. The content distribution device according to claim 1, wherein a switching handover layer straddling a first stack in which a protocol in the first wireless communication system is specified and a second stack in which a protocol in the second wireless communication system is specified is arranged, and
the controller transfers the second information from the first stack to the second stack through the switching handover layer to hand over the second information.

8. The content distribution device according to claim 7, wherein in the first stack, a connection layer in which the packet number is exchanged when a wireless path with the second stack is switched is arranged above a MAC layer of the first wireless communication system, and
the switching handover layer is arranged above the connection layer.

9. The content distribution device according to claim 8, wherein an OBEX layer or an SCSI layer is arranged above the switching handover layer, and
the controller transmits the rest of the packets communicated through the first wireless communication unit based on a definition of the OBEX layer or the SCSI layer based on the second information in the transmission of the packets.

10. The content distribution device according to claim 1, wherein the controller performs division into packets of a size that is transmittable per once as data packets that are divided and transferred based on the second wireless communication system in the division of the packets.

11. The content distribution device according to claim 1, wherein the first information are information capable of identifying a packet to be transmitted next.

12. The content distribution device according to claim 1, wherein the first information are serial numbers added in order from the packet configuring a head of the distribution data file.

13. The content distribution device according to claim 1, further comprising,
a non-volatile memory configured to store the distribution data file.

14. The content distribution device according to claim 1, wherein the first connecting unit is connectable to a third storage device including the first antenna, the first wireless communication unit, and a first non-volatile memory configured to store the distribution data file, and
the second connecting unit is connectable to a fourth storage device including the second antenna, the second wireless communication unit, and a second non-volatile memory configured to store the distribution data file.

15. The content distribution device according to claim 1, wherein the first connecting unit is connectable to a first communication device including the first antenna and the first wireless communication unit, and the second connecting unit is connectable to a second communication device including the second antenna and the second wireless communication unit.

16. The content distribution device according to claim 1, wherein the first wireless communication system is a wireless LAN, and
the second wireless communication system is TransferJet.

17. A content distribution device comprising:
a connecting unit that is connectable to a storage device including a first antenna, a first wireless communication unit that performs data communication with a content reception device through the first antenna based on a first wireless communication system, a second antenna, and a second wireless communication unit that performs data communication with the content reception device through the second antenna based on a second wireless communication system, the first wireless communication system enabling communication to be performed in a communication range larger than a communication range of the second wireless communication system, the second wireless communication system enabling communication to be performed at a data transfer rate higher than a data transfer rate of the first wireless communication system; and
a controller configured to distribute a distribution data file to the content reception device,
wherein the controller is configured to
divide the distribution data file into a plurality of packets,
add first information indicating packet numbers in a transmission order,
transmit the packets having the first information,
switch communication with the content reception device from the first wireless communication system to the second wireless communication system while transmitting the distribution data file to the content reception device, and
hand over second information indicating the packet number to the second wireless communication unit when the communication with the content reception device is switched from the first wireless communication system to the second wireless communication system, and
the second wireless communication unit transmits the packets from a middle of the transmission order based on the handed over second information to the content reception device.

18. The content distribution device according to claim 17, wherein the controller is configured to further acquire terminal identification information including first identification information that is stored in the content reception device and used when communication based on the first wireless communication system is performed and second identification information used when communication based on the second wireless communication system is performed through the communication based on the first wireless communication system after communication with the content reception device is established based on the first wireless communication system, and
the second information includes the terminal identification information in addition to the packet numbers.

19. The content distribution device according to claim 18, wherein the second wireless communication unit determines whether or not identification information is identical to the second identification information included in the second information, the identification information being acquired from a terminal that is in a communicable state based on the second wireless communication system, and
the controller performs switching from the first wireless communication system to the second wireless communication system when the identification information is identical to the second identification information.

20. A storage device comprising:
a first antenna;
a first wireless communication unit that performs data communication with a content reception device through the first antenna based on a first wireless communication system;
a second antenna;
a second wireless communication unit that performs data communication with the content reception device through the second antenna based on a second wireless communication system, the first wireless communication system enabling communication to be performed in a communication range larger than a communication range of the second wireless communication system, the second wireless communication system enabling communication to be performed at a data transfer rate higher than a data transfer rate of the first wireless communication system;
a non-volatile memory; and
a controller configured to distribute a distribution data file in the non-volatile memory to the content reception device in a state where the storage device is connected to an information processing device,
wherein the controller is configured to
divide the distribution data file into a plurality of packets,
add first information indicating packet numbers in a transmission order,
transmit the packets having the first information,
switch communication with the content reception device from the first wireless communication system to the second wireless communication system while transmitting the distribution data file to the content reception device, and
hand over second information indicating the packet number to the second wireless communication unit when the communication with the content reception device is switched from the first wireless communication system to the second wireless communication system, and
the second wireless communication unit transmits the packets from a middle of the transmission order based on the handed over second information to the content reception device.

* * * * *